O. C. TUTTLE.
FISH BAIT.
APPLICATION FILED APR. 25, 1918.
1,302,102.
Patented Apr. 29, 1919.
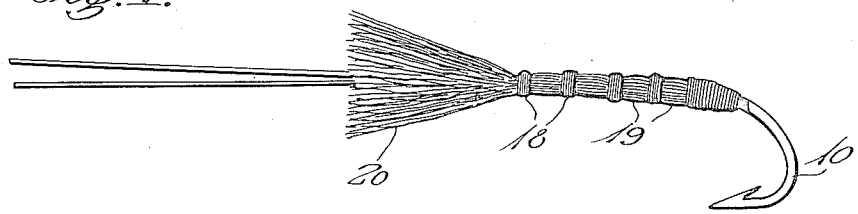
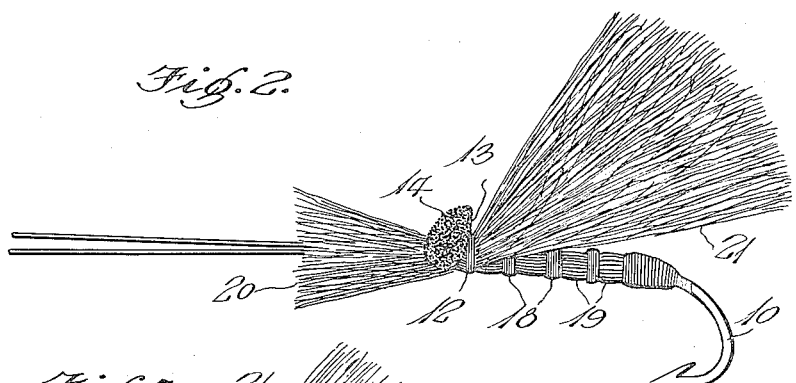
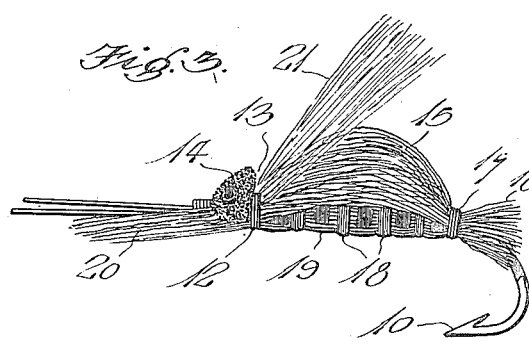
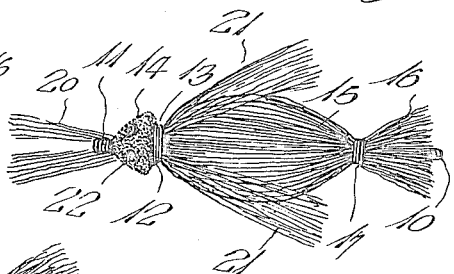
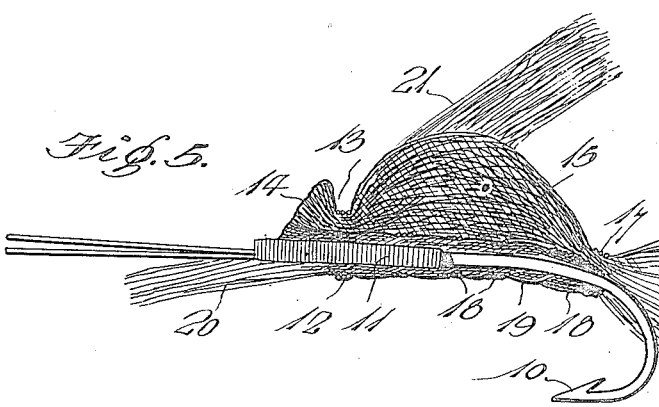
Witness
H. Woodard
Inventor
O. C. Tuttle
By
Attorneys

UNITED STATES PATENT OFFICE.

ORLEY C. TUTTLE, OF OLD FORGE, NEW YORK.

FISH-BAIT.

1,302,102.

Specification of Letters Patent.  Patented Apr. 29, 1919.

Application filed April 25, 1918. Serial No. 230,776.

*To all whom it may concern:*

Be it known that I, ORLEY C. TUTTLE, a citizen of the United States, residing at Old Forge, in the county of Herkimer and State of New York, have invented certain new and useful Improvements in Fish-Baits; and I do declare the following to be a full, clear, and exact description of the invention, such as will enable others skilled in the art to which it appertains to make and use the same.

This invention relates to fish baits, and it relates more particularly to an improved artificial bait constructed to represent an animal, bird, insect, or other living creature.

One of the objects of this invention is to provide a bait having the maximum fish-luring aspect.

Another object is to provide a fish bait having a taste that will cause the fish to return to the bait after once having tasted the same.

Another object is to provide a fish bait that is soft and elastic so as to simulate the body of a living creature.

Another object is to provide an artificial bait that is tough, tenacious, buoyant, lustrous and largely impervious to water.

Another object is to provide a filamentous material for fish baits which is so flexible and elastic that it is susceptible of being arranged to form fish baits in representation of numerous animals, birds and insects.

Other objects and advantages may become apparent to persons who read the following details of description in connection with the accompanying drawings, in which—

Figures 1, 2 and 3 show different embodiments of this invention; or different steps in making the bait;

Fig. 4 is a top plan view of the bait shown in Fig. 3, and

Fig. 5 is a somewhat enlarged vertical sectional view through the bait constructed in accordance with the disclosure in Figs. 3 and 4.

Referring to these drawings in detail, in which similar reference characters correspond with similar parts throughout the several views, the hook 10 may be of any ordinary construction, though preferably of the character disclosed in Fig. 5, in which the shank of the hook is straight and secured to the fish line by means of the wrapped connection 11.

The main feature of this invention consists in the material employed in the construction and arrangement of the bait on the hook, and in the preparation of the material before applying the same to the hook; and the material and preparation thereof will, therefore, be described before its application to the hook is explained, as follows:

It has been ascertained by discovery and experiment that the body hair from the pelt of a deer is especially applicable and advantageous in the construction of fish baits, because such hair is long, lustrous, compressible, elastic, tough, tenacious, considerably tapering and cellular and largely impervious to water. In order that the foregoing advantageous qualities may be completed by the quality of taste which is attractive to bass and other fish, the deer's hair is subjected to the action of salt and alum prior to the removal of the hair from the pelt, and this is effected by preparing an aqueous solution of salt and alum, and submerging the pelt in such solution. After the pelt is removed from the solution, a suitable quantity of hair is removed and formed into a tuft by the application of a string, wire or other flexible element 12, which surrounds the shank of the hook and the tuft so as to compress the latter and thereby form a neck 13. The base or butt end of the tuft is trimmed at 14 to form a head, where it is desired that the bait shall simulate a living creature, and the major portion 15 of the tuft simulates the back of the living creature, the bow of the hook and the finer ends of the filaments or hairs 16 simulating the tail of the living creature. In order to thus form the back 15 and tail portion 16, a wrapping element 17 is employed, as shown in Figs. 3, 4 and 5. In order to render the body of the animal more lustrous, the wrappings 12 and 17 may be of nickel or silver wire, and wrappings 18 of such wire or of silk may be employed for securing an additional tuft 19 on the hook when desired. While this additional tuft is not absolutely essential, it is considered expedient to employ the same in substantially all the different forms of bait constructed in accordance with this invention.

Referring to Fig. 1, this form may constitute a complete lure or bait in representation of a worm having feelers 20 or the like, or it may constitute an element of one of the more complete baits illustrated in the remaining figures.

Referring to Fig. 2, this may either constitute a complete bait, in which the filaments represent or simulate wings 21, or this may constitute the unfinished bait illustrated in the remaining figures.

In order to complete the simulation of a living creature, the previously trimmed ends of the filaments which represent the animal's head have paint applied thereto at 22 to represent eyes.

It has been found that a fish bait constructed in accordance with the foregoing description is very attractive to game fish, such as bass, trout, etc., and that it is not only attractive to the vision of the fish, but that when a fish has once seized the bait, it appears to be impressed with the genuineness of the same as an article of food, and loses no time in returning to again seize the bait.

Although I have specified deer's hair as the preferred material from which the baits are constructed, it is to be understood that other filamentous material may be employed, and similarly subjected to the action of alum and salt or to other chemicals which may produce a similar effect.

Claims:

1. In a fish bait, a fish hook, a tuft of fluffy and compressible filaments arranged lengthwise of the shank of the fish hook, a wrapping element around said filaments and hook at a point spaced from one end of said tuft, and a second wrapping element around said filament and spaced from the first said wrapping element, said wrapping elements embracing the tuft so tightly that said tuft is thereby considerably constricted adjacent thereto while remaining fluffy and expanded at portions forward and rearward of said wrapping elements, one of said fluffy ends being formed to simulate the head of a living creature, the portion between said wrapping element simulating the body of a living creature, the constricted portion adjacent to said head simulating the neck of the living creature.

2. In a fish-bait, a fish-hook, a tuft of fluffy and compressible filaments arranged lengthwise of the shank of the fish-hook, a wrapping element around said filaments and shank at a point spaced from one end of said tuft, and a wrapping element around said filaments and hook at a point spaced from the other end of said tuft, said wrapping elements embracing the tuft so tightly, that said tuft is thereby considerably constricted adjacent to said ends while remaining fluffy and expanded at portions forward and rearward of said wrapping elements, one of said fluffy ends being formed to simulate the head of a living creature, the portion between said wrapping elements being arched longitudinally from one to the other of said wrapping elements and simulating the body of a living creature, the constricted portion adjacent to said head simulating the neck of the living creature.

3. A fish bait comprising a fish-hook, a tuft of filaments parallel with and secured on the shank of the fish-hooks and having ends projecting beyond the end of said shank to simulate feelers of a living creature, wrappings around said tuft in spaced relation to one another, said wrappings being of a color different from the color of said tuft, so as to simulate stripes across the body of a living creature; a second tuft of filaments arranged lengthwise on one side only of the first said tuft and of said wrappings; a wrapping adjacent to and spaced from the end of the second said tuft at the said ends that simulate feelers, this end of the second said tuft being of a shape to simulate the head of a living creature; and a wrapping around the other end portion of the second said tuft and being spaced from this end so that a tail is simulated by the filament-ends beyond this wrapping, the intermediate portion of the last said tuft being arched longitudinally so as to simulate the back of a living creature.

4. A fish bait comprising a fish-hook, a tuft of filaments parallel with and secured on the shank of the fish-hook and having ends projecting beyond the end of said shank to simulate the feelers of a living creature; wrappings around said tuft in spaced relation to one another, said wrappings being of a color different from the color of said tuft, so as to simulate stripes across the body of a living creature; a second tuft of filaments arranged lengthwise on one side only of the first said tuft and of said wrappings; a wrapping adjacent to and spaced from the end of the second said tuft at the said ends that simulate feelers, this end of the second said tuft being of a shape to simulate the head of a living creature; means to simulate eyes applied to the ends of the filaments that represent the head; and a wrapping around the other end portion of the second said tuft and being spaced from this end so that a tail is simulated by the filament-ends beyond this wrapping, the intermediate portion of the last said tuft being arched longitudinally so as to simulate the back of a living creature.

5. The process of forming a fish bait that simulates a living creature having a body and head and neck, consisting in providing a fish-hook and a tuft of fluffy and compressible filaments and wrappings, arranging the tuft lengthwise along the shank of the fish hook, wrapping said tuft and hook sufficiently tight with said wrappings to constrict the tuft between said head and body and thereby form the neck, trimming one end of the tuft to simulate the head, and treating the ends of groups of the filaments at said one end of the tuft to simulate eyes of the living creature.

In testimony whereof I have hereunto set my hand in the presence of two subscribing witnesses.

ORLEY C. TUTTLE.

Witnesses:
M. COHEN,
HERBERT H. PARKER.